United States Patent [19]

Andon

[11] Patent Number: 5,468,506
[45] Date of Patent: * Nov. 21, 1995

[54] CONCENTRATED BIOAVAILABLE CALCIUM SOURCE

[75] Inventor: Mark B. Andon, Fairfield, Ohio

[73] Assignee: The Procter & Gamble Company, Cincinnati, Ohio

[*] Notice: The portion of the term of this patent subsequent to Mar. 28, 2012, has been disclaimed.

[21] Appl. No.: 184,771

[22] Filed: Jan. 21, 1994

Related U.S. Application Data

[63] Continuation of Ser. No. 964,316, Oct. 21, 1992, abandoned.

[51] Int. Cl.$^6$ .................................................. A23L 1/304
[52] U.S. Cl. .......................... 426/74; 426/648; 426/654; 426/658
[58] Field of Search .................... 426/74, 658, 648, 426/654

[56] References Cited

U.S. PATENT DOCUMENTS

| | | | |
|---|---|---|---|
| 4,551,342 | 11/1985 | Nakel et al. | 426/548 |
| 4,722,847 | 2/1988 | Heckert | 426/74 |
| 4,737,375 | 4/1988 | Nakel et al. | 426/590 |
| 4,830,862 | 5/1989 | Braun et al. | 426/74 |
| 4,867,977 | 9/1989 | Gailly et al. | 424/687 |
| 4,871,554 | 10/1989 | Kalala et al. | 426/74 |
| 4,919,963 | 4/1990 | Heckert | 426/599 |
| 4,992,282 | 2/1991 | Mehansho et al. | 426/72 |
| 4,994,283 | 2/1991 | Mehansho et al. | 426/74 |
| 5,028,446 | 7/1991 | Saleeb et al. | 426/590 |
| 5,188,513 | 6/1992 | Mehansho | 426/2 |

FOREIGN PATENT DOCUMENTS

| | | | |
|---|---|---|---|
| 0227174 | 1/1987 | European Pat. Off. | A23L 2/02 |
| 0244903 | 11/1987 | European Pat. Off. | A23L 2/38 |
| 0301653 | 2/1989 | European Pat. Off. | A23L 2/26 |
| 304987 | 3/1989 | European Pat. Off. | A23L 1/19 |
| 304986 | 3/1989 | European Pat. Off. | A61K 31/91 |
| 346866 | 12/1989 | European Pat. Off. | A23L 1/304 |
| 0470259 | 2/1991 | European Pat. Off. | A23L 2/00 |
| 56-097248 | 8/1981 | Japan | C07C 51/41 |
| 2207335 | 2/1989 | United Kingdom | A23L 2/00 |
| WO8909604 | 10/1989 | WIPO | A61K 33/32 |
| WO91/19692 | 12/1991 | WIPO | C07C 59/265 |

OTHER PUBLICATIONS

Johnston Jr. et al., "Calcium Supplementation and Increase in Bone Mineral Density in Children", N. Eng. J. Med., 327:82–87, Jul. 9 1992.

Dawson–Hughes et al., "A Controled Trial of the Effect of Calcium Supplementation in Bone Density in Postmenopausal Women", N. Eng. J. Med. 323(13):878–881, Sep. 27, 1990.

Bishop, "Calcium Slows Bone Loss for Women Past Menopause, Experiment Shows", Wall Street Journal, Sep. 27, 1990.

Unknown, "Calcium Prevents Bone Loss in Postmenopausal Women", Tufts University Press Release (Boston, Mass., Sep. 1990).

Hudepohl et al., "Effects of Sugar Alcohols on Calcium Bioavailability from Fruit Juices", Presentation given Apr. 1990.

Mehansho et al., "Calcium Bioavailability and Iron–Calcium Interaction in Orange Juice", J. of the Amer. College of Nutr., 8(1):61–68, 1989.

Holbrook et al., "Dietary Fructose or Starch: Effects on Copper, Zinc, Iron, Manganese, Calcium, and Magnesium Balances in Humans", Am J Clin Nutr. 49:1290–4, 1989.

Riis et al., "Does Calcium Supplementation Prevent Postmenopausal Bone Loss?" N. Eng. J. of Med. 316(4):174–177, Jan. 22, 1987.

Nilas et al., "Calcium Supplementation and Postmenopausal Bone Loss", Brit. Med. J. 289:1103–6, Oct. 27, 1984.

07/964,238 Burkes, et al. Oct. 21, 1992.

07/964,239 Burkes, A. L., Fox, M. M. Oct. 21, 1992.

07/814,030 Zuniga et al. Dec. 26, 1991.

07/964,315 Burkes et al. Oct. 21, 1992.

Primary Examiner—Helen Pratt
Attorney, Agent, or Firm—R. A. Dabek; M. B. Graff; J. C. Rasser

[57] ABSTRACT

Sweetener supplement compositions which provide a bioavailable source of calcium containing a) soluble calcium;

b) an edible acid component comprising a mixture of citric acid and malic acid wherein said mixture has a weight ratio of citric acid to malic acid of from about 90:10 to about 10:90; and c) sugar; in which the weight ratio of the edible acid component to the soluble calcium is from about 3:1 to about 17:1; sugar comprises at least 15%, on a dry weight basis, fructose and the weight ratio of sugar to edible acid component is from about 1:1 to about 40:1.

8 Claims, No Drawings

CONCENTRATED BIOAVAILABLE CALCIUM SOURCE

This is a continuation of application Ser. No. 07/964,316 now abandoned, filed on Oct. 21, 1992.

TECHNICAL FIELD

The present invention relates to concentrated bioavailable calcium sources in the form of sweetener supplements with significant levels of concentrated calcium citrate malate. The supplements are for use in foods, beverages and pharmaceuticals.

BACKGROUND OF THE INVENTION

Vitamin and mineral supplements for human and veterinary use are commonplace. Some diets, heavy physical exercise and disease conditions can require the intake of considerable quantities of minerals and vitamins apart from those generally obtained from what otherwise would be considered a normal diet. Vitamin and mineral supplementation is important primarily for those who have inadequate diets, including growing children. Older adults have an additional need for calcium to help prevent age-related bone loss. Postmenopausal women need additional calcium due to hormonal changes which can accelerate the rate of bone loss leading to a further diminishment in bone mass. Therefore, supplementation of the diet with a highly bioavailable source of calcium is desirable.

Calcium can be obtained from a variety of dietary sources. Primary sources of calcium are dairy products, in particular milk, which account for 75% of the daily calcium intake while foods other than dairy products generally contribute less than 200 mg of calcium daily. However, beginning in young adulthood and continuing through later life, the general population may not consume milk in sufficient quantities to obtain the recommended dietary levels of calcium. This diminished consumption can be caused by lactose intolerance as well as by the unattractiveness of milk as a drink for social occasions.

One consideration for the efficacy of calcium supplementation is that all calcium sources are not equally soluble or bioavailable. Calcium citrate is poorly soluble in water; 1 gram of calcium citrate dissolves in 1,050 grams of cold water. Calcium malate exhibits a slightly greater solubility. Calcium hydroxide is only slightly soluble in water, and it absorbs carbon dioxide from the air to readily form calcium carbonate which is also limited in terms of solubility.

It is essential for the bioavailability of calcium that the calcium salts be soluble in the stomach and intestine. This solubility aids in making calcium more readily available for absorption. Thus, the choice of calcium salts depends upon the interaction of the salts with secretions in the stomach and intestine.

Chewable tablets are a popular form of calcium supplements. However, they leave a gritty mouthfeel and a chalky aftertaste which many find unpleasant. The utility of these known supplements varies. Unlike agents, such as estrogen, which affect the metabolism of bone, calcium nutritional supplements have been thought to merely provide another source of the nutrient which may or may not be properly absorbed and metabolized.

Concentrated liquid bioavailable calcium supplements are unknown in the art. Several beverages containing calcium are known however, they provide milk level calcium ($\frac{1}{3}$ RDA) in 6 to 8 oz. of beverage; are cloudy, often show signs of solids settling, and are available in limited flavors (usually citrus).

Calcium citrate malate (CCM) is a highly bioavailable source of calcium. Calcium citrate malate may be obtained as a powder or can be formed in situ. Currently, calcium citrate malate can be obtained in certain commercially available juice beverages which provide milk level calcium in a good tasting product.

A need exists to provide a means of fortifying a variety of normally consumed food and beverage products. A sweetener supplement fortified with a concentrated bioavailable calcium source, such as calcium citrate malate can provide a means to fortify food and beverages in a liquid form and carrier, which is commonly used as a normal ingredient in the preparation of food and beverage products. Such a sweetener supplement would preferably be in a pourable/pumpable solution for maximum ease in usage. Formulating a pourable/pumpable solution with concentrated calcium citrate malate causes difficulties in solubilizing the solid ingredients such as the acids, sugar and calcium source. As more calcium is added more acid is added and there is less liquid to dissolve, the solids. This means that the components used to form CCM account for larger and larger proportions of the solids and generally from about 5% to 65% by weight of the compositions of the present invention.

The object of the present invention is to prepare sweetener supplements which are nutritionally supplemented with concentrated calcium citrate malate; are bioavailable; are clear solutions visually undistinguishable from commonly used liquid sweeteners; and when used in beverages and foods can provide an acceptable taste.

DEFINITIONS

As used herein the term, "calcium citrate malate" or "CCM" refers to a mixture or complex of calcium, citrate and malate..

As used herein, the term "malic acid" refers to the mixture of the D and the L isomers, i.e., malic acid is optically active and the racemic mixture is used herein. D-malic acid and L-malic acid can be used separately or mixed.

As used herein, "water" includes the total amount of water present in the composition. "Water" includes water from flavors, juice concentrates, sugar syrups and other sources, e.g., gum solutions. Water of hydration of calcium and other solids is also included.

As used herein, "solids" are primarily the dissolved sugars, salts, gums, acids and soluble calcium. "Fructose solids" refers to the dissolved fructose. Typically, solids are measured by the refractive index and are called °Brix. °Brix approximates the dissolved solids content of the concentrate.

As used herein, "comprising" means various components can be conjointly employed in the sweetener supplement compositions of the present invention. Accordingly, the terms "consisting essentially of" and "consisting of" are embodied in the term "comprising".

By "nutritional" or "nutritionally-supplemental amount" herein is meant that the amount used in the practice of this invention provides a nourishing amount of calcium at typical daily ingestion levels of the final product. This is supplemental or in addition to the calcium normally present in the diet. Typically the supplemental amount will comprise from about 10% to about 300% of the Recommended Dietary Allowance (RDA) of calcium. Preferably, at least 30% of the Recommended Dietary Allowance (RDA) will be provided. The RDA is as defined in the United States of America (see Recommended Daily Dietary Allowance-Food and Nutrition Board, National Academy of Sciences-National Research Council).

Specific compounds and compositions to be used in the processes herein must be food approved or pharmaceutically acceptable. The compositions must be edible and approved for human and/or animal consumption. As used herein, a "pharmaceutically acceptable" component is one that is suitable for use with humans and/or animals without undue adverse side effects (such as toxicity, irritation and allergic response) commensurate with a reasonable benefit/risk ratio when used in the manner of this invention. The specific "safe and effective amount" will, obviously, vary with such factors as the physical condition of the consumer, the age of the consumer, the nature of concurrent drug therapy (if any) and the specific formulations employed.

As used herein, the term "single strength beverage(s)" refers to a beverage composition in a ready-to-serve, drinkable form. It will usually be less than 15° Brix.

"Sugar(s)", as used herein, means a carbohydrate sweetener. Preferably, they are mono and disaccharides such as glucose, sucrose, maltose, fructose, sugar alcohols, low molecular weight dextrins and related carbohydrates. The term "sugar(s)" includes both liquid syrups and crystalline or solid sugars. "Sugar(s)" also includes liquid fructose, high fructose corn syrup solids, invert sugar, maltose syrup and sugar alcohols, including sorbitol and mixtures thereof. Artificial or high intensity sweeteners are not encompassed by the term sugar(s).

SUMMARY OF THE INVENTION

A sweetener supplement composition providing bioavailable calcium comprising:

a) soluble calcium;

b) An edible acid component comprising a mixture of citric acid and malic acid wherein said mixture has a weight ratio of citric acid to malic acid of from about 90:10 to about 10: 90; and c) sugar;

wherein the weight ratio of said edible acid component to said soluble calcium is from about 3:1 to about 17:1; wherein said sugar comprises at least 15% on a dry weight basis, fructose and wherein the weight ratio of sugar to edible acid component is from about 1:1 to about 40:1 is disclosed.

All percentages and ratios herein are on a weight basis unless otherwise specified.

DETAILED DESCRIPTION

Bioavailability Enhancement

The effects of glucose and glucose polymers on calcium absorption have been previously demonstrated. See Wood, R. J., Gerhardt A. and Rosenberg I. H., "Effects of Glucose and Glucose polymers on Calcium Absorption in Healthy Subjects", Am. J. Clin. Nutr. 1987; 46:699–701. Using a variety of experimental techniques, glucose (or glucose polymers) has been shown to enhance calcium absorption in both rats and humans. See Zheng, J. J., Wood, R. J., Rosenberg, I. H., "Enhancement of Calcium Absorption in Rats by Coadministration of Glucose Polymer", Am. J. Clin. Nutr. 1985; 41:243–5. Effects of organic acids on calcium absorption have also been assessed. Oxalic acid is known to reduce calcium bioavailability. See Heaney, R. P., Weaver, C. M., "Oxalate: Effect on Calcium Bioavailability", Am. J. Clin. Nutr. 1989; 50:830–2. However, calcium absorption from salts of gluconate, acetate, citrate, lactate and carbonate have been shown to be equivalent to each other and to that of milk. See Sheikh, M. S., Santa Ana, C. A., Nicar, M. J., Schiller, L. R., Fordtran, J. S., "Gastrointestinal Absorption of Calcium From Milk and Calcium Salts", N. Engl. J. Med. 1987; 317:532–6. The absorption of calcium from calcium citrate malate has been found to be superior to both calcium carbonate and milk and thus, by inference to all other calcium sources known to be equally or less bioavailable than calcium carbonate and milk. See Smith, K. T., Heaney, R. P., Flora, L., Hinders, S. M., "Calcium Absorption From a New Calcium Delivery System (CCM)", Calcif. Tissue Int. 1987; 41:351–2, and Miller, J. Z., Smith, D. L., Flora, L., Slemenda, C., Jiang, X , Johnston, C L Jr., "Calcium Absorption From Calcium Carbonate and a New Form of Calcium (CCM) in Healthy Male and Female Adolescents", Am. J. Clin. Nutr. 1988; 48:1291–4. Surprisingly, it has now been discovered that varying the organic acid and sugar profile of calcium citrate malate sweetener supplement compositions containing fructose is useful in improving calcium bioavailability.

EXAMPLE I

The effects of sugar profile on calcium bioavailability were evaluated by measuring intestinal calcium transport in vitro. Monolayers of cells from the human derived Caco-2 intestinal cell line were cultured onto microporous filters using standard cell culture techniques. The Caco-2 cell line is advantageous for this purpose because it displays many of the histological and biochemical characteristics of the human small intestinal cell in vivo. The transport of $^{45}Ca$ from the luminal (intestinal) to the serosal (blood stream) side of the cells was used as a marker of calcium absorption from several aqueous test preparations containing varying compositions of sugars. All test solutions were prepared in a standard buffer solution appropriate for performing cell culture experiments and containing 0.4 grams calcium/liter.

A third set of samples were assessed after pretreating the cells with 1,25 dihydroxy cholecalciferol [1,25 $(OH)_2D_3$], a metabolically active form of vitamin D known to stimulate the intestinal absorption of calcium. Compared to untreated cells, the calcium absorption rate was increased by 24% in both samples tested (data not shown). However, the effect of sugar composition on calcium absorption in the vitamin D stimulated cells (shown below) was essentially the same as that in unstimulated cells.

| Sample Tested | wt:wt:wt ratio of fructose:glucose: sucrose | n | calcium transport rate (mean ± SEM) compared to test sample no. 5 |
|---|---|---|---|
| 5 | 26:28:43 | 3 | — |
| 6 | 61:23:16 | 3 | 111 ± 4% |

These data demonstrate that improvements in calcium bioavailability from mixed sugars systems are made by adjusting the sugar weight ratios to favor greater fructose concentrations. Moreover, there is uniform improvement in calcium absorption which is independent from vitamin D metabolism.

EXAMPLE II

The effect of sugars and citric acid and malic acid on calcium bioavailability was assessed using a rat whole body $^{47}$Ca retention technique. This bioassay is convenient because it measures the net result of absorption throughout the entire gastrointestinal tract and accounts for multiple routes of calcium excretion. Young adult male Sprague-Dawley rats were housed individually in environmentally controlled rooms and fed standard laboratory chow and tap water. Several samples containing calcium citrate malate, radiolabelled with $^{47}$Ca, were administered to the animals by oral gavage (n=8/group). Whole body radioisotopic levels were measured immediately after dosing (time 0) and 72 hours later in a small animal whole body gamma counter. All radioisotope levels were corrected for background radiation and the 72 hour level for decay of the $^{47}$Ca isotope. Percent bioavailability was calculated as the 72 hour isotopic level divided by the time 0 level×100. All preparations were aqueous and contained 1.3 grams calcium/liter.

| Sample Tested | wt:wt ratio of citric:malic | wt:wt:wt ratio of fructose:glucose:sucrose | % calcium bioavailability mean ± SEM |
| --- | --- | --- | --- |
| 1 | 64:36 | 0:0:0 (no sugar added) | 30 ± 5 |
| 2 | 64:36 | 30:24:46 | 45 ± 2 |
| 3 | 64:36 | 61:23:16 | 52 ± 2 |
| 4 | 39:61 | 0:0:0 (no sugar added) | 30 ± 5 |
| 5 | 39:61 | 30:24:46 | 53 ± 3 |
| 6 | 39:61 | 61:23:16 | 61 ± 3 |

Altering the citric:malic weight ratio in the absence of sugar had virtually no effect on bioavailability. In contrast, in the presence of sugars, greater bioavailability was achieved with an acid weight ratio which favors malic acid. The addition of sugars always improved calcium bioavailability. However, at a given citric:malic weight ratio, greater calcium bioavailability occurs with a sugar composition which favors a greater fructose content. Thus, preferred compositions with respect to calcium bioavailability are those containing sugars. Further, calcium bioavailability is greatly enhanced in compositions in which the acid weight ratio favors malic, and the sugar weight ratio favors fructose.

To summarize, it has been discovered that interactive actions of organic acid weight ratios and sugar weight ratios lead to improved calcium bioavailability. Key to these learnings are the observations that 1) greater fructose concentrations increase calcium bioavailability from the calcium citrate malate; 2) varying the citric:malic weight ratio to favor malic acid also improves calcium bioavailability in the presence of sugars. Therefore a method of providing a bioavailable source of calcium is to administer a safe and effective amount of a sweetener supplement composition comprising an edible acid component to soluble calcium ratio (wt/wt) of from about 3:1 to 17:1, preferably from about 5:1 to 13:1, and most preferably from about 6:1 to 8:1. The edible acid component comprises a mixture of citric acid and malic acid wherein said mixture has a weight ratio of citric acid to malic acid of from about 90:10 to about 10:90, preferably from about 80:20 to about 20:80, and most preferably containing at least 50% by weight malic acid. Further, a sugar to edible acid component ratio (wt/wt) of from about 1:1 to about 40:1, preferably from about 4:1 to about 25:1, and most preferably from about 5: 1 to about 15: 1. The sugar component comprises at least 15%, preferably at least about 25% to about 30%, and most preferably at least 50% fructose (on a dry weight basis).

Sugars

Sugars are expressed on a dry weight basis. For example, one hundred grams of a high fructose corn syrup having 77% solids of which 42% may be fructose solids, (the remainder of the solids being glucose and minors) and 23% water would provide seventy-seven grams of solids and twenty-three grams of water.

In addition to fructose, preferred sugars for use in the present invention are glucose (dextrose), maltose, sucrose, invert sugar and mixtures thereof.

Most preferred for use in all the present compositions is a combination of sugars comprising from about 15% to about 99%, preferably from about 25% to about 99% fructose, since it has been discovered that having at least 15% fructose increases bioavailability and aids the inhibition of calcium precipitation and/or sucrose crystallization over time and at high temperatures.

Generally, fructose is used in the form of liquid fructose, high fructose corn syrup, dry crystalline/solid fructose, fructose syrup and mixtures thereof. The high fructose corn syrups useful in the present invention comprise from about 71% to about 77% solids and from about 23% to about 29% water wherein from about 42% to about 90% of the solids are fructose solids. A high fructose corn syrup referred to as "liquid fructose" is the most preferred source of fructose. Liquid fructose has about 77% solids and about 23% water wherein the solids are from about 95% to about 100% fructose solids.

Preferred sources of fructose are: High Fructose Corn Syrup 42 (HFCS 42) comprising about 71% solids (about 42% being fructose, about 28% being dextrose and about 1% being maltose) and about 29% water and supplied by A. E. Staley; High Fructose Corn Syrup 55 (HFCS 55) comprising about 77% solids (about 55% fructose, 22% dextrose and minors) and about 23% water and supplied by A. E. Staley; and Liquid Fructose comprising about 77% solids (about 99% fructose and the remainder minors) and 23% water and supplied by A. E. Staley.

It should be noted that sugars, especially mixtures containing fructose, have been unexpectantly found to enhance the absorbability/bioavailability of calcium.

Calcium

In general, the Recommended Dietary Allowance (RDA) for calcium will range from about 400 mg per 6 kg for infants up to about 1200 mg for females and males, age 11 to 24. 1200 mg is the recommended RDA for lactating women. One fluid ounce of the sweetener supplement compositions of the present invention typically can supply from about 10% to about 300% RDA for any given individual.

The sweetener supplement compositions of the present invention comprise a mixture of calcium; the acid anions, citrate and malate; and sugar, at least 15% of which is fructose. Calcium citrate malate (CCM) is a bioavailable source of calcium comprising a mixture of calcium salts, citric acid and malic acid. CCM is formed in situ in the liquid medium (added water and/or sugar syrups) by the reaction of a calcium salt or mixtures thereof and the edible acid component.

To be useful in the present invention, the calcium must be "solubilized", i.e., dissolved, in the liquid medium. Accordingly, the amount of calcium included in the sweetener supplement compositions of the present invention will be referred to in terms of "solubilized calcium", i.e., the amount of calcium ion dissolved.

Suitable sources of calcium include calcium carbonate, calcium oxide, calcium hydroxide, calcium sulfate, calcium chloride, tricalcium phosphate, calcium hydrogen phosphate and calcium dihydrogen phosphate, as well as the respective organic salts of calcium, e.g., calcium citrate, calcium malate, and calcium tartrate.

It has been discovered that from about 3% to about 30% of the soluble calcium can be provided by an acidic calcium salt such as calcium chloride, calcium sulfate, calcium nitrate, calcium acetate, and mixtures thereof. Although not an acidic calcium salt, calcium lactate can be used to provide from about 3% to about 30% of the soluble calcium and it provides an effect similar to that produced by using an acidic calcium salt. Preferably, from about 10% to about 20% of the soluble calcium is sourced from an acidic calcium salt and/or calcium lactate. Preferred acidic calcium salts for use herein are calcium chloride, calcium nitrate, calcium sulfate and mixtures thereof.

Mixtures of calcium carbonate and calcium hydroxide, which optionally include calcium chloride, calcium sulfate and calcium nitrate, are useful and often preferred for use in the sweetener compositions of the present invention. The most preferred calcium sources are calcium carbonate, calcium hydroxide and mixtures thereof, since these calcium salts are neutralized by the organic acids, forming carbon dioxide and/or water.

For compositions comprising from about 2.4% to about 7% soluble calcium, calcium hydroxide is not preferred for use as the sole calcium source.

The sweetener supplement compositions of the present invention comprise from about 2.5% to about 5% solubilized calcium. Preferably, the sweetener compositions comprise from about 3% to about 5% solubilized calcium.

Edible Acid Component

A key component for the bioavailable supplement compositions of the present invention is the edible acid component. It is important to this invention that the calcium be completely neutralized by the citric and malic acids and that the anionic charge from the acids be in excess of the cationic charges from the calcium source. The product herein must have an excess of acid equivalents from citric and malic acids.

Water

The supplement compositions comprise from about 25% to about 60% by weight, water. The amount of water present will determine the concentration of the compositions.

The preferred weight ratio of water to fructose solids for the sweetener supplement compositions is from about 2:1 to about 1:2. The more preferred weight ratio of water to fructose is from about 1.5:1 to about 1:2 and the most preferred weight ratio of water to fructose solids is from about 1:1.

pH

The sweetener supplement compositions generally have a pH of less than or equal to about 3.8. Preferably, the pH is less than or equal to about 3.4 and more preferably less than or equal to about 3.2. Typically, the pH will range from about 2.5 to .about 3.8. The pH is measured on the sweetener supplement as is without dilution.

OPTIONAL COMPONENTS

The supplement compositions of the present invention may comprise any other ingredient or ingredients typically used as optional ingredients. Other minor ingredients are frequently included. Such ingredients include preservatives such as benzoic acid and salts thereof, sulfur dioxide, etc. Preferably, preservatives are added to the concentrated sweetener supplements as long as the pH is above about 3.3 and the solids content is less than about 42%. Colors derived either from natural sources or synthetically prepared can be used.

Gums, emulsifiers and oils can be included to change the texture and opacity of the sweetener supplement. Typical ingredients include guar gum, xanthan, alginates, mono and diglycerides, lecithin, pectin, pulp, cottonseed oil, vegetable oil and weighting oils. Esters and other flavor and essence oils can also be used.

If optional components, such as a flavor component, are used, the additional water, citric acid, malic acid and/or sugars must be accounted for in the formulation of the sweetener supplements of the present invention.

Acidic Anion Component: Chloride, Nitrate and Sulfate

An optional component for the sweetener supplement compositions of the present invention is the level of organic acidic anions present, such as chloride anion, nitrate anion, sulfate anion, acetate anion and mixtures thereof. The supplement compositions of the present invention can comprise from about 0.05% to about 5% of an acidic anion, preferably chloride anion, nitrate anion, sulfate. anion and mixtures thereof. The acidic anion typically provides an improvement in stability by a factor of two. It has been discovered that from about 0.05% to about 5% of lactate anion can also be used and it provides an effect similar to acidic anions. The lactate anion can be obtained from its corresponding acid form or preferably from its corresponding calcium salt. When utilizing lactate anion and acetate anion, mixtures of anions are preferred since the lactate and/or acetate anions can introduce off-flavors.

Preferably, the level of acidic anion is in the range of from about 0.05% to about 5%. ! More preferably, the level is from about 0.2% to about 3%. These ranges are based on the weight of the anion and not on the salt. That is, the weight of the cation is ignored.

The chloride, nitrate and sulfate anions are preferably obtained from their corresponding acid forms, i.e., hydrochloric acid and nitric acid, or from their corresponding calcium salts such as calcium chloride, calcium nitrate, or calcium sulfate.

Preferably the acidic anion is obtained by sourcing from about 3% to about 30% of the soluble calcium from an acidic calcium salt such as calcium chloride, calcium nitrate, calcium sulfate, calcium acetate, and mixtures thereof. Although not an acidic calcium salt, calcium lactate can be used to provide from about 3% to about 30% of the soluble calcium and it provides an effect similar to that produced by using an acidic calcium salt. Preferred acidic calcium salts used are calcium chloride, calcium nitrate, calcium sulfate and mixtures thereof.

Calcium chloride, calcium nitrate, calcium sulfate and mixtures thereof can supply from about 3% to about 30% of the solubilized calcium. Preferably, calcium chloride, calcium nitrate, calcium sulfate and mixtures thereof supply from about 10% to about 20% of the solubilized calcium present. Preferably, the remaining soluble calcium comes from calcium carbonate, calcium hydroxide and mixtures thereof. These sources have the advantage of being neutralized by the acids.

The most preferred acidic anion for use is chloride anion. Preferably, the chloride anion is derived from calcium chloride, which can provide from about 3% to about 30% solubilized calcium. More preferably, calcium chloride provides from about 10% to about 20% solubilized calcium. Due to the lower solubility level of sulfate, mixtures of sulfate anions with other suitable anions are preferred.

The use of chloride, nitrate, sulfate, acetate and lactate anions in the supplement compositions of the present invention contributes to the stability at high temperatures when using high levels of solubilized calcium, e.g., milk level and above.

Flavor Component

The particular amount of the flavor component effective for imparting flavor characteristics to the sweetener supplement compositions can depend upon the flavor(s) selected, the flavor impression desired and the form of the flavor component. The flavor component of the present invention is preferably selected from the group consisting of fruit flavors and botanical flavors.

The term "fruit flavor(s)" refers to those flavors derived from the edible reproductive part of a seed plant, especially one having a sweet pulp associated with the seed. Also included within the term "fruit flavor" are synthetically prepared flavors made to simulate fruit flavors derived from natural sources. The citrus flavors including orange flavors, lemon flavors, lime flavors and grapefruit flavors can be used. Besides citrus flavors, a variety of other fruit flavors can be used such as apple flavors, grape flavors, cherry flavors, pineapple flavors and the like. Preferred fruit flavors are apple, grape, cherry and the like as well as mixtures thereof. These fruit flavors can be derived from natural sources such as fruit juices and flavor oils, or else synthetically prepared.

The term "botanical flavor(s)" refers to flavors derived from parts of a plant other than the fruit; i.e., derived from beans, nuts, bark, roots and leaves. Examples of botanical flavors include cocoa, chocolate, vanilla, coffee, cola, tea and the like. Botanical flavors can be derived from natural sources such as essential oils and extracts, or can be synthetically prepared to simulate botanical flavors derived from natural sources.

Fruit and botanical concentrates and purees can be used. Fruit and botanical juices are not preferred for use as flavoring agents. However, if juice is used the amount of juice used as the flavorant depends on its concentration and is easily determined by one skilled in the art.

The water in any flavoring agent used is to be included in the total water percentages of the sweetener compositions. Sugars are to be accounted for in the sugar level.

Uses

Food compositions of the present invention can contain from about 1% to about 99% of the supplement compositions. Preferred embodiments of these food compositions include baked goods, fruit drinks/mixes, frozen foods, candies, carbonated beverages, milk drinks/mixes, gelatins, puddings, fillings, breakfast cereals, breakfast bars, sauces, jams, jellies, whipped toppings, tablets, syrups, orally administered medicines, spreads, chewing gums, candies and chocolates. The preferred food compositions are confectionary products such as candy bars, Fruit Roll-ups®, gums, candies, baked goods and beverages.

The supplement compositions of the present invention can be substituted for part of the sugars in a food composition depending on the amount of calcium needed and/or the concentration. Just as adjustments are made in recipes and formulations for the different properties of sucrose and fructose or dextrose, adjustments for the different properties of the sweetener compositions must be made. These changes can be made by one skilled of one in the art.

The following is by way of example a partial list of food compositions which can be made with these sugar derivatives: cakes, cookies, brownies, other sweet snacks, icings, frostings, pie fillings, puddings, frosted cereals, coated nuts (Honey roasted nuts), creams, hard and soft candies, chocolates, crackers, snacks made from potatoes, corn, wheat and other grains, sauces, gravies, yogurt, ice cream, jellies, jams, breadings, breads, rolls, muffins, doughnuts and sweet rolls.

Corn breakfast cereals can be prepared by coating the corn kernels before processing, cooking the corn kernels in the sweetener supplements, and coating the corn kernels after they are flaked and toasted preferably by spraying on the sweetener supplement. The preferred method is by low moisture cooking the corn kernels in the sweetener supplement composition.

Method of Preparation

The calcium salts react with the organic acids so the calcium is solubilized in the processing step. While not wishing to be bound by theory, it is believed that a metastable calcium citrate malate complex is formed. The calcium salts, e.g., calcium carbonate, along with the citric and malic acids remain in solution in the sweetener supplement compositions. When processed in the manner described herein, the calcium citrate malate is more soluble than the corresponding salts, i.e. calcium citrate and calcium malate.

In order to achieve the maximum stability benefit, the materials should be added in a particular sequence. When sugars and calcium salts are solubilized, they compete for water to remain in solution. To make a concentrated solution which is free from precipitates, all solids should be dissolved or slurried in liquid media, preferably in water or liquid fructose, either as a premix or during the addition step.

Several premixes or solutions are formed. The sugars are dissolved in water if a crystalline or solid form of sugar is being used. For ease of preparation, liquid sugars or syrups are most preferred for use. Preferred sugar sources are liquid fructose, invert syrup and high fructose corn syrup.

The citric and malic acids are also dissolved in water. Once the acids are dissolved, the acidic anion source if utilized, e.g., calcium chloride, is then added to the solution containing the citric and malic acids. The addition of an acidic anion source, e.g., calcium chloride, has two advantages, one being the pH of the solution is reduced making calcium solubility more favorable and the other being that greater stability from calcium salt precipitation at high temperatures is obtained. If used the preservatives and optional ingredients, i.e. thickeners, gums, alginates, pectins, emulsifiers are dissolved or slurried in liquid media to form a premix.

The sugar is then added to the acids in solution.

It is desirable that the calcium source be prepared as a slurry, however, it is not necessary. Thus the calcium source(s), e.g., calcium carbonate, is dispersed in water, liquid fructose, high fructose corn syrup or other sugar syrup. If the embodiment requires their use, the acidic calcium salts, can be first dissolved in water by adding slowly with agitation. The remaining calcium sources are then added to make a slurry. Adequate agitation must be used to keep the slurry in suspension particularly when using calcium hydroxide which tends to form a paste in corners and dead spots.

If utilized, the flavor component is another premix. If the flavor component contains citric or malic acids, as for example, a fruit juice or fruit juice concentrate would, the ratio of the citric to malic acid will preferably be adjusted to be the same as in the citric and malic acid premix. Additional citric or malic acid is added if necessary to achieve this ratio. Otherwise, calcium citrate or calcium malate can form during the processing step and precipitate. Once precipitated, they are difficult to redissolve.

To improve the stability of the calcium malate and especially the calcium citrate species, it is preferred to adjust the fructose (on a dry weight basis) to water weight ratio to range from about 1:1 to about 2:1. The addition of fructose reduces the water available for the formation of the insoluble calcium salts such as $Ca_3Cit \cdot 4H_2O$ and also enhances the bioavailability. Hence for stability for greater than about one week a weight ratio of fructose (on a dry weight basis) to water of from about 2:1 to about 1:2 is preferred. If a flavor component is used, stability can be improved by adjusting the weight ratio of citric acid to malic acid in the flavor component or solution containing the calcium, sugar and acids premixes such that they are equivalent before addition of the flavorant to the solution. Preferably, the weight ratio of citric acid to malic acid will range from about 20:80 to about 80:20 and more preferably about 26:74. In addition, stability can be improved by adjusting the weight ratio of fructose (on a dry weight basis) to water in the flavorant or solution containing the calcium, sugar and acids premixes such that they are equivalent before addition of the flavorant to the solution.

One preferred mixing sequence is as follows:

The sugars and the acid solution are mixed with agitation to produce a uniform mixture. The addition sequence is not critical. The acids can be dissolved in the mix tank with water and the sugar solution pumped in, or the sugar solution can be put into the tank and the acid solution pumped in.

To this mixture is added the calcium slurry or dry calcium source. The addition is controlled so that the reaction mixture does not become too hot. The temperature should not exceed 120° F. (49° C.). Methods of keeping the temperature below 120° F. (49° C.) include using jacket cooling or recirculating the batch through a heat exchanger. The calcium source is neutralized by the citric and malic acids during this addition and excess acid is present. The temperature rises due to the heat of neutralization. When calcium carbonate is used, the neutralization produces carbon dioxide which can cause foaming. This can be controlled by the rate of addition of calcium carbonate.

Optionally, flavor is then added to the calcium, citric and malic acid sugar mixture. Any preservatives, gums, emulsifiers, vitamins, minerals vegetable oils, weighting oils, or other optional ingredients are added at this stage. These materials are added as a water solution or as liquids.

Another preferred mixing sequence is as follows:

The water and 30% of a High Fructose Corn Syrup (HFCS) is heated to 100° F. (38° C.). The acids are added to the solution and mixed with agitation until dissolved. High shear mixing, milling or dispersators can be used to provide sufficient mixing in low water systems. When an acidic calcium salt or calcium lactate is used it is also dissolved in this solution.

The dry calcium source is dispersed in the remaining HFCS. When using calcium carbonate, the addition is controlled so that foaming caused by the neutralization product, carbon dioxide, is controlled. When calcium hydroxide is used, the neutralization process is an exothermic reaction. The addition is controlled so that reaction mixture does not exceed 120° F. (49° C.).

Method of Preparation of Low Water Systems When Using High Fructose Corn Syrup or Liquid Fructose.

When preparing samples with a very low water content, less than or equal to about 20%, it is necessary to use as much as 70% of the Liquid Fructose, and/or high fructose corn syrup (HFCS). This will provide the water necessary to dissolve the acids. The water and 70% of the Liquid Fructose and/or High Fructose Corn Syrup, are heated to 100° F. (38° C.). The acids are added to the solution and mixed with agitation until dissolved. Dissolving the acids in water is endothermic causing the temperature to drop. Thus, additional heat may be needed to dissolve the acids. Continued heating may be necessary to dissolve the acids. Care is taken so that the temperature does not exceed 120° F. (49° C.). When acidic calcium salts, e.g. calcium chloride are used, the), are also dissolved in this solution.

The dry calcium source is dispersed in the remaining sugar syrup. The addition is controlled so that foaming caused by the neutralization product, carbon dioxide, is controlled. At this point the composition is very viscous. Continued heating may be necessary. The addition is controlled so that reaction does not exceed 120° F. (49° C.). p Methods of Preparation of Low Water Systems When Using Fructose or Crystalline Sugars.

When preparing samples very low in water content, less than or equal to about 20%, it is necessary to use heat. The water is heated to 100° F. (38° C.). The acids are added to the solution and mixed with agitation until dissolved. The sugar is then added. Continued heating may be necessary to dissolve the sugars. Care is taken so that temperature does not exceed 120° F. (49° C.). When calcium chloride is used, it is also dissolved in this solution.

To this mixture is added the dry calcium source. The addition is controlled so that foaming caused by the neutralization product, carbon dioxide is controlled. At this point the syrup is very viscous. Continued heating may be necessary. When calcium hydroxide is used, the neutralization process is an exothermic reaction therefore the amount of heating used can be reduced. The addition is controlled so that reaction mixture does not exceed 120° F.

The sweetener supplement compositions are generally shelf-stable due to their low water activity. However, the compositions can be pasteurized with a short time, high temperature treatment or otherwise sterilized as is conventional for products of this type.

Basically, this is a process for preparing a shelf-stable calcium fortified beverage concentrate, comprising:

(1) preparing a mixture of a sugar solution and citric and malic acid in water;

(2) adding a slurry of calcium salts in water, wherein any calcium citrate, calcium malate, acidic calcium salt and acidic anion source is first dissolved in water and then other calcium salts are added to make the slurry, said slurry being added with agitation and wherein the temperature is maintained below 120° F.;

(3) adding to the mixture of (2) the flavor component dissolved in water, wherein the weight ratio of citric and malic acid in the flavor component is in the same ratio as the citric and malic acids in (1) and the weight ratio of fructose (on a dry weight basis) to water in the flavor component is in the same ratio as in (1); and (4) adding to the mixture of (3) any preservatives and optional ingredients in water.

What is claimed is:

1. A bioavailable calcium composition consisting essentially of a) soluble calcium, b) an edible acid component comprising a mixture of citric acid and malic acid, and c) sugar; wherein said edible acid component has a weight ratio of citric acid to malic acid of from about 90:10 to about 10:90; wherein the weight ratio of said edible acid component to said soluble calcium is from about 3:1 to about 17:

1; wherein said sugar comprises from about 25% to about 99% fructose, on a dry weight basis, and wherein the weight ratio of sugar to edible acid component is from about 1:1 to about 40:1.

2. A composition according to claim 1 wherein the weight ratio of citric and malic anions from about 80:20 to about 20:80 and the sugar to acid ratio is from about 4:1 to about 25:1.

3. A composition according to claim 2 wherein the acid component is at least about 50% malic acid.

4. A composition according to claim 2 containing water wherein at least about 25% of said sugar is fructose and the weight ratio of water to fructose is from about 1.5:1 to about 1:2.

5. A composition according to claim 4 wherein the weight ratio of sugar to acid is from about 5:1 to about 15:2.

6. A composition according to claim 5 further comprising from about 0.05% to about 5% of an acidic anion.

7. A composition according to claim 6 wherein the acid to calcium ratio is from 5:1 to about 13:1.

8. A sweetener supplement composition according to claim 2 further comprising from about 0.2% to about 4%, of an acidic anion.

* * * * *